C. A. RAMSEY.
Cotton-Sprinkler.
No. 163,526. Patented May 18, 1875.
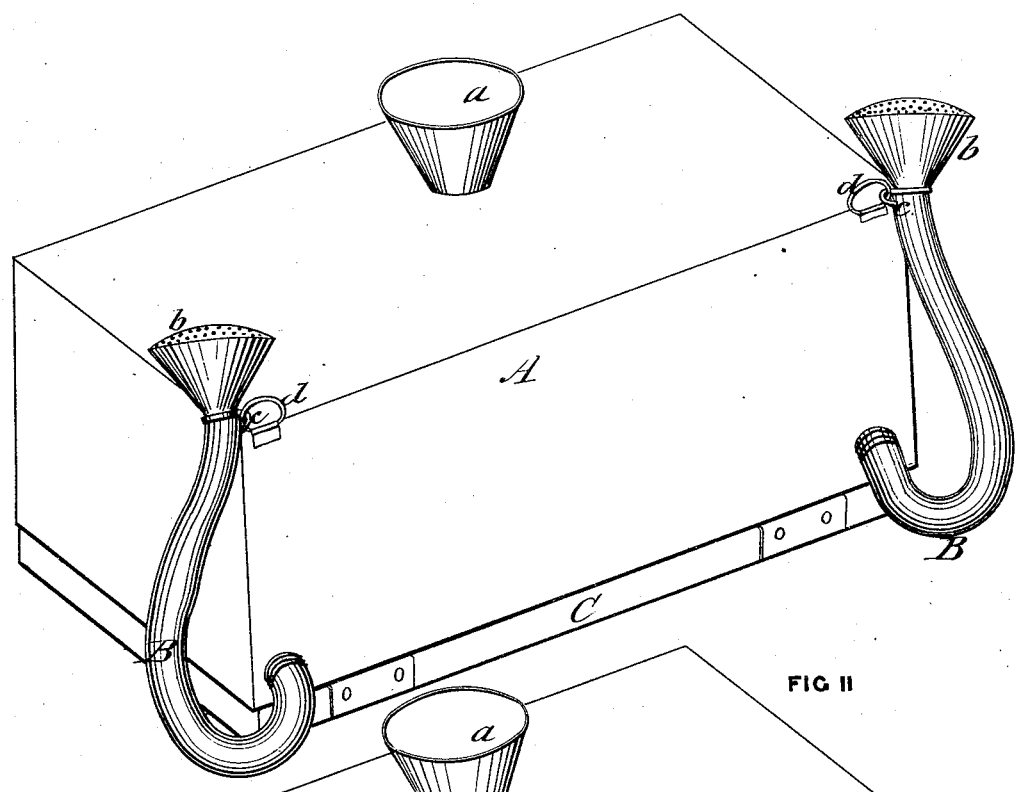
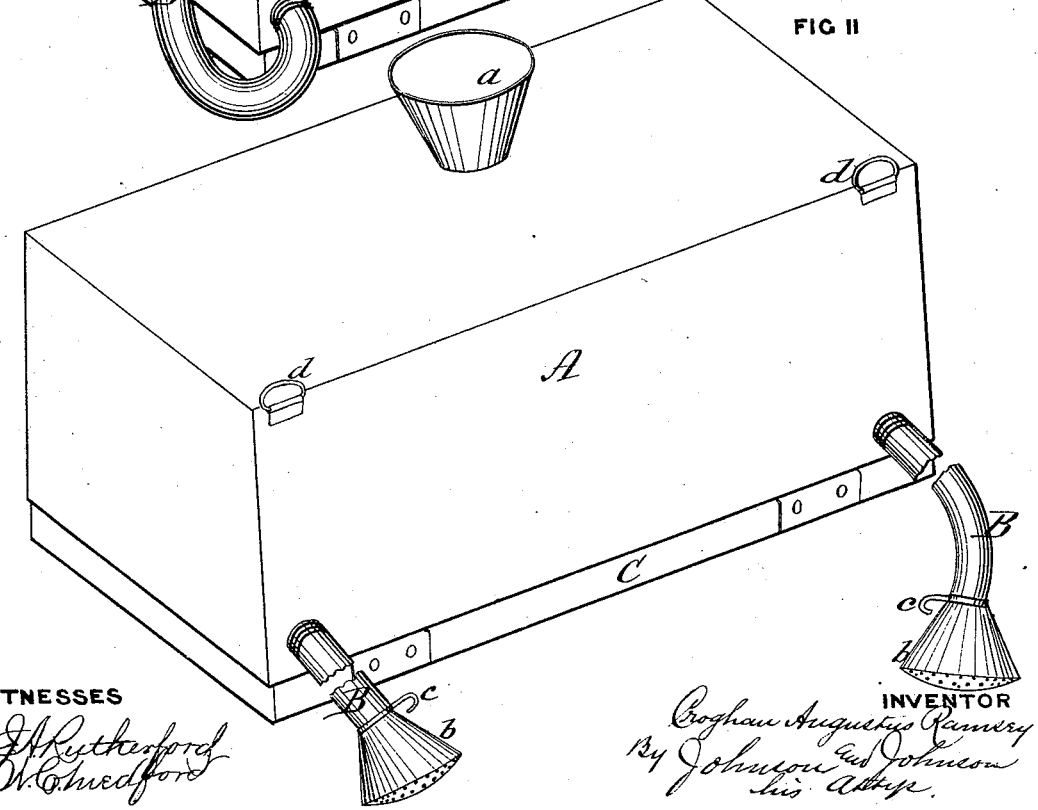

UNITED STATES PATENT OFFICE.

CROGHAN A. RAMSEY, OF SCHULENBURG, TEXAS.

IMPROVEMENT IN COTTON-SPRINKLERS.

Specification forming part of Letters Patent No. 163,526, dated May 18, 1875; application filed March 8, 1875.

*To all whom it may concern:*

Be it known that I, CROGHAN A. RAMSEY, of Schulenburg, in the county of Fayette and State of Texas, have invented certain new and useful Improvements in Cotton-Sprinklers; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention consists in the combination, in a cotton-sprinkler, having a fluid-vessel, of flexible ejecting-hose, having flaring-nozzle sprinklers, with hooks or fastening devices for holding the nozzles in elevated positions upon the vessels, whereby the driver has perfect control both over the flow and direction of the fluid, and is thereby enabled to inject the fluid upon the two rows of plants, without regard to their height or the uncertain movement of the horse between the rows, and to stop the flow by elevating and hooking the ejecting-hose to the upper corners of the vessel, thus rendering the device much more effective in directing the fluid than could possibly be effected by fixed distributing perforated cocks, and preventing unnecessary waste of the fluid.

In the accompanying drawings, Figure 1 represents a view of my cotton-worm destroyer in perspective, showing the tubes hooked up and not in use, and Fig. 2 represents a view of the same as in use when mounted upon a horse's back, and spraying upon the rows of cotton.

The box or vessel A is of any suitable size, generally sufficient to hold five gallons, and it may be made of sheet-iron or wood. It is provided at its top with a receiving-funnel, $a$, for the liquid, which may be pure water, or water with poisonous mixtures, when deemed necessary.

Projecting from the bottom, or from the front side near the bottom, and near each end, are flexible tubes or rubber hose B, which are provided with spraying-sprinkler nozzles $b$, through which the water or fluid is ejected with some force upon the rows of cotton.

This device is generally strapped upon a horse's back, to the cantle of a saddle, with the tubes B in front, one on each side of the horse. The nozzles $b$ are held above the top of the box A by means of hooks $c$, which seize over rings $d$ upon the top corners of the box, so that they will be above the level of the water in the box, and hence prevent the water from flowing when not desired.

The box or vessel is filled by pouring into the funnel $a$ upon the top.

When the cotton-worm destroyer is strapped behind the saddle upon the horse's back, as above, then a man or boy mounts, and guiding the horse between the rows of cotton, takes a tube, B, in each hand, and so proceeds, sprinkling the rows upon each side. The sprinkling may be stopped in an instant by raising the nozzles $b$ above the level of the fluid in the box, and, of course, the lower the nozzles are held, the greater will be the flow.

The front of the vessel A is inclined backward, so as not to interfere with the movements of the rider; and a pad, C, may be placed under it, so as to cause it to rest easy upon the horse.

I am aware that cotton-sprinklers have been used strapped to the saddle of a horse, and the cans for the fluid provided with fixed distributing-cocks, with crescent-shaped perforated nozzles, by means of which liquid poison can be shed over a wide space, and I do not claim such device, as my invention aims at means for effecting and directing the fluid upon cotton plants under the complete control of the rider, and thereby make direct discharges upon the plants, and save unnecessary waste of fluid.

I claim—

The combination, in a cotton-worm destroyer, of the fluid-vessel A, with the flexible ejecting-hose B B, having flaring nozzle-sprinklers $b$ $b$, and hooks or fastening devices for holding the nozzles in elevated positions upon the vessel, whereby the rider has control both over the discharge of the fluid and the direction thereof upon the rows of plants, as described.

In testimony that I claim the foregoing I have affixed my signature in presence of two witnesses.

CROGHAN A. RAMSEY.

Witnesses:
GEO. W. TUTTLE,
J. S. BURNS.